Patented Nov. 17, 1936

2,060,850

UNITED STATES PATENT OFFICE 2,060,850

QUATERNARY AMMONIUM COMPOUNDS AND PROCESS FOR THE PRODUCTION THEREOF

William Stansfield Calcott, Penns Grove, N. J., and Richard Gesse Clarkson, Wilmington, Del., assignors to E. I. du Pont de Nemours & Company, Wilmington, Del., a corporation of Delaware No Drawing. Application November 8, 1932, Serial No. 641,806

12 Claims. (Cl. 260—127)

This invention relates to chemical compounds, more particularly chemical compounds which are useful as detergents, and a process for the manufacture thereof.

As is well known, certain substances which are useful in neutral solutions as detergents, wetting and penetrating agents for a wide variety of purposes, particularly in the textile and leather industries, are characterized by the disadvantage that they are insoluble in acidic solutions. In some cases, substances which are good detergents in soft water are precipitated by the heavy metal and alkaline earth metal salts occurring in hard water. Thus, ordinary soaps, that is, alkali metal salts of the high fatty acids, are good detergents in neutral soft water and may be used in alkaline solutions to some extent, provided the alkali concentration is not too high, but they are precipitated in acidic solutions, in hard water, and in solutions having a relatively high alkali concentration.

It is an object of the present invention to produce new chemical compounds. A further object is to produce compounds which possess valuable properties of detergent, wetting and penetrating power in neutral, alkaline and acidic aqueous solutions, and in hard water. A still further object is the provision of new and improved treatment liquids which are especially useful in the textile industry. Another object is the provision of a new and improved process for producing chemical compounds and treatment liquids of the character above described. Other objects will appear hereinafter.

These objects are accomplished by producing chemical compounds having the following formula:

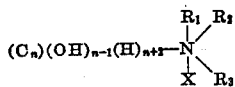

wherein $n$ is 5 or 6, $R_1$ is an aliphatic radical, preferably having eight or more carbon atoms, $R_2$ is an aliphatic radical, $R_3$ is an aliphatic radical, and X is the residue of an acid.

Products having the foregoing general formula in which X is the residue of an inorganic acid may be obtained by combining a tertiary amine having the formula

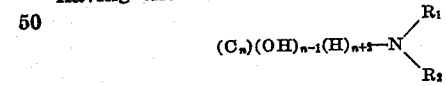

wherein $R_1$ and $R_2$ have the foregoing signification, with an aliphatic halide or other aliphatic inorganic ester. The corresponding quaternary ammonium salts of organic acids may be produced from the quaternary ammonium inorganic salts in any suitable manner. Water-soluble quaternary ammonium compounds of the class described have been found to possess excellent detergent power in neutral, alkaline, and acidic aqueous solutions and in hard water.

While the invention is susceptible of considerable variation and modification in the manner of its practical application, particularly as regards the specific materials used, the proportions thereof, and the exact method of procedure, the following examples, in which the parts are by weight, will serve to illustrate how products falling within the invention may be prepared.

Example I

A mixture consisting of 15 parts of N-methyl glucyl amine, 24 parts of cetyl chloride, 12 parts of sodium carbonate, 30 parts of 1:1 alcohol-benzene mixture, and a trace of potassium iodide was heated in a closed copper-lined autoclave at 150° C. for five hours. The reaction mixture was then treated with a large amount of alcohol and the inorganic salts removed by filtration. The product obtained as a cream-colored solid by evaporating the alcoholic filtrate to dryness was most probably N-methyl-N-glucyl cetyl amine. A solution of about 15 parts of this product in 50 parts of ethyl alcohol was treated with about 15 parts of ethyl iodide and the mixture boiled under reflux for four hours. The solvent ethyl alcohol and the excess ethyl iodide were removed by evaporation, leaving the product N-methyl-N-ethyl-N-glucyl cetyl ammonium iodide as a brown, semi-fluid mass.

Example II

Instead of the ethyl iodide, ethyl bromide may be reacted with N-methyl-N-glucyl cetyl amine, as described in Example I, to produce N-methyl-N-ethyl-N-glucyl cetyl ammonium bromide.

Example III

Methyl iodide may be reacted with N-methyl-N-glucyl cetyl amine, as described in Example I, to produce N:N-dimethyl-N-glucyl-cetyl ammonium iodide. Instead of N-methyl-N-glucyl cetyl amine, N-methyl-N-glucyl oleyl amine may be reacted with the methyl iodide to produce N:N-dimethyl-N-glucyl oleyl ammonium iodide.

Example IV

Three parts of the N-methyl-N-ethyl-N-glucyl cetyl ammonium iodide produced as in Example I were added to 1000 parts of distilled water and the resultant treatment bath was tested by washing woolen felt, soiled as described by Rhodes and Brainard, Journal of Industrial and Engineering Chemistry, 21, 60 (1929), in an ordinary launderometer and judging optically the degree of cleanliness. The N-methyl-N-ethyl-N-glucyl cetyl ammonium iodide was found to be as effective a detergent as soap in distilled water at the same concentration.

Example V

A treatment bath was prepared by adding 25 parts of the product of Example I to 10,000 parts of water containing about 4 parts of calcium chloride, and the resultant liquid tested for detergent power as described in Example IV. It was found that the N-methyl-N-ethyl-N-glucyl cetyl ammonium iodide was as effective in the calcium chloride solution as in distilled water. Soap, on the other hand, gave no cleansing whatever.

Example VI

To an acidic solution comprising substantially 1000 parts of water and 2 parts of sulfuric acid (100%) there were added 2.5 parts of N-methyl-N-ethyl-N-glucyl cetyl ammonium iodide, and the resultant bath was tested as in Example IV. It was found that the acidic treatment liquid, to which N-methyl-N-ethyl-N-glucyl-cetyl ammonium iodide had been added, was as effective as the bath prepared from distilled water, whereas a similar acidic bath containing soap in the same concentration had no cleansing effect.

Example VII

A treatment bath was prepared by dissolving 2.5 parts of N-methyl-N-ethyl-N-glucyl cetyl ammonium iodide in a solution comprising substantially 1000 parts of water and 5 parts of sodium carbonate. The resultant bath was tested as in Example IV, and it was found that the cleansing effect of the N-methyl-N-ethyl-N-glucyl cetyl ammonium iodide was as good in the alkaline solution as in the acidic solution of Example VI.

The tertiary amines used as starting materials in accordance with the process of the invention may be prepared in any suitable manner, for example, by the condensation of a secondary amine, such as N-methyl-glucamine, N-methyl-xylamine, N-butyl-xylamine, N-ethyl-glucamine, N-hydroxyethylglucamine, N-methyl-galactamine, N-methyl-fructamine, and the like, with a higher alkyl halide such as, for example, capryl bromide, lauryl bromide, myristyl bromide, cetyl chloride, stearyl chloride, oleyl bromide and the like, as described in our co-pending application, Serial No. 641,322 which has matured into U. S. Patent 2,016,956 of October 8, 1935. Another method of preparing such amines is described in a co-pending application of Robert B. Flint and Paul L. Salzberg, Serial No. 635,045, which has matured into U. S. Patent 2,016,962 of October 8, 1935, in which mono-saccharides containing 5 or 6 carbon atoms are reacted with a secondary amine and hydrogen under elevated pressure and at an elevated temperature in the presence of a hydrogenating catalyst.

As specific examples of aliphatic halides or other aliphatic inorganic esters which may be combined with tertiary amines of the character above described to produce the new quaternary ammonium compounds may be mentioned methyl-iodide, methyl-bromide, ethyl-iodide, ethyl-bromide, ethyl-chloride, isopropyl-bromide, isopropyl-chloride, allyl-bromide, amyl-bromide, dimethyl-sulfate, diethyl-sulfate and the like.

The procedure employed in the production of new quaternary ammonium compounds is subject to considerable variation. In general, the reaction between the tertiary amine and the alkyl inorganic ester may be effected by heating together the reactants. The temperature employed may vary within relatively wide limits, depending largely upon the specific compound treated, but should preferably be sufficiently high to enable the reaction to proceed smoothly and quickly but insufficiently high to cause the formation of decomposition products. In general, temperatures within the range of about 25° C. to 150° C. give desirable results. It is preferable, also, to effect the reaction in a solvent such as, for example, an alcohol-benzene mixture or an aqueous alcohol solution. Generally speaking, any inert solvent may be used.

As previously indicated, the quaternary ammonium salts of inorganic acids may be converted to the quaternary ammonium salts of organic acids in any suitable manner. This may be accomplished, for instance, by reacting a quaternary ammonium halide with a compound capable of replacing the halogen by a hydroxyl radical and then treating the resulting product with an organic acid. Thus, a quaternary ammonium bromide of the type herein described may be reacted with a compound such as silver oxide in the presence of water, whereby the insoluble silver bromide is precipitated and the bromine atom is replaced by a hydroxyl group. The resultant product may then be treated with an organic acid, such as, for example, acetic, formic or benzoic, to produce the acetate, formate or benzoate. In a similar manner, quaternary ammonium halides of the class described may be converted to other quaternary ammonium inorganic salts by treatment of the quaternary ammonium hydroxide with an inorganic acid, as for example, hydrochloric, sulfuric, sulfurous, phosphorous and the like. Another method of procedure is to treat the quaternary ammonium halide with a salt capable of forming an insoluble halide with the halogen atom.

The products which are preferably employed as detergents are those which have the formula

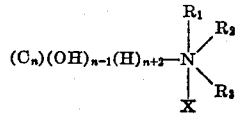

wherein $n$ is 5 or 6, $R_1$ is an aliphatic hydrocarbon radical having eight or more carbon atoms, $R_2$ and $R_3$ represent the same or different aliphatic radicals, being such that the compound is water-soluble, and X represents the residue of an inorganic acid. Very highly advantageous results have been obtained in the use of compounds having the foregoing general formula in which the poly-hydroxy-aliphatic radical is a normal radical having 6 carbon atoms and the following general formula:

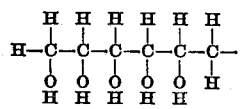

(generally referred to as the glucyl group). It is further desirable that the compound be one in which, according to the general formula, $R_1$ is a straight chain or normal radical having eight or more carbon atoms (e. g., capryl, lauryl ($—C_{12}H_{25}$), myristyl, cetyl, stearyl ($—C_{18}H_{37}$), cerotyl, oleyl ($—C_{18}H_{35}$), ricinoleyl, and the like), and $R_2$ and $R_3$ are the same or different lower aliphatic radicals, preferably alkyl radicals containing not more than four carbon atoms. Desirable results in the application of the products in treatment liquids may also be obtained with compounds in which $R_2$ and $R_3$ represent the same or different substituted aliphatic hydrocarbon radicals, preferably having not more than four carbon atoms and having as substituents hydroxy, sulfate or sulfonic acid groups. As further specific examples of compounds falling within the invention, in addition to those given in the examples, may be mentioned: N-methyl-N-ethyl-N-glucyl cetyl ammonium chloride, N-methyl-N-glucyl-N-cetyl hydroxyethyl ammonium iodide, N-methyl-N-ethyl-N-glucyl cetyl ammonium sulfate, N-methyl-N-ethyl-N-glucyl lauryl ammonium bromide, N-methyl-N-ethyl-N-glucyl stearyl ammonium iodide, N:N-dimethyl-N-glucyl oleyl ammonium chloride, N:N-diethyl-N-glucyl oleyl ammonium chloride, N-methyl-N-ethyl-N-xylyl cetyl ammonium iodide, N-ethyl-N-butyl-N-xylyl cetyl ammonium bromide, N-methyl-N-ethyl-N-galactyl oleyl ammonium iodide, N:N-diethyl-N-fructyl cetyl ammonium chloride, and N-methyl-N-(1-propane 2:3 diol)-N-glucyl cetyl ammonium iodide.

The new class of compounds described are valuable for use in practically all processes or for any purpose where it is desirable to employ a detergent or a substance possessing wetting and penetrating power. They are particularly advantageous because they may be used in alkaline, neutral and acidic aqueous solutions and also in hard water, whereas many detergents are ineffective in one or more of such liquids. Because of their great effect of cleansing power in acid solutions, the new products are particularly valuable in cleaning silk, wool and other materials which are detrimentally affected by the alkaline solutions. They may also be used for cleansing cotton and fibers or fabrics of cellulosic origin in alkaline solutions.

The treatment baths prepared in accordance with the invention may contain, in addition to the products herein described, other compounds which are surface active or possess cleaning, wetting, penetrating or dispersing properties. As examples of additional materials possessing washing, cleansing, emulsifying and wetting power may be mentioned, trisodium phosphate, Turkey red oils, ordinary soaps, aromatic sulfonic acids (such as alkylated naphthalene sulfonic acids), mineral oil sulfonic acids, sulfonated derivatives of abietic acid, higher alkyl sulfuric esters, saponin and aliphatic and aromatic acid amides, such as sodium taurocholate or sodium salts of analogous acid amides. The products of the invention may also be employed in combination with neutral, acid or basic salts such as, for example, sodium sulfate, sodium chloride, sodium acetate, disodium phosphate, sodium bisulfate, and similar compounds of the other alkali metals or of ammonium.

Other additional materials with which the products of the invention may be combined are bleaching and disinfecting agents such as persulfates, percarbonates and perborates; filling materials such as talc, marble-dust and starch; adsorbing materials such as suitable clays, e. g., fuller's earth; protective colloids or dispersing agents such as gum tragacanth, gall acids and their derivatives, agar-agar, glue, methyl cellulose, sulfite cellulose lyes, sodium cellulose phthalate, calcium saccharate, albumin, sodium cellulose glycollate, gelatin, natural and artificial resins, derivatives of cholesterine, phosphatides, gelloses, natural and artificial waxes, wool waxes, solvent and softening agents, organic bases and their salts such as alkylolamine salts and other quaternary ammonium compounds, inorganic colloids, and alkalies; and scouring materials such as kieselguhr, powdered pumice, sulfur, flour, china clay, salt and the like. Desirable results for many purposes may also be obtained by employing the new quaternary ammonium compounds as herein described in combination with the various acyclic, monocyclic, or complex cyclic terpenes or derivatives thereof such as, for example, limonene, dipentene, terpinolene, phellandrene, sylvestrene, pinene, bornylene, sabinene and their alcoholic, ketonic and aldehydic derivatives. It will be apparent, furthermore, that our new products may be combined with a wide variety of other additional materials which possess washing, cleansing, emulsifying, wetting, dispersing, adsorbing, lathering, bleaching, germicidal and bacterocidal powers. They may likewise have incorporated therewith artificial or natural perfuming substances, many of which in themselves may possess detergent properties of some value.

Throughout the specification and claims, it will be understood that the term "aliphatic hydrocarbon" is intended to include both saturated and unsaturated aliphatic hydrocarbon radicals unless otherwise indicated.

As many apparently widely different embodiments of this invention may be made without departing from the spirit and scope thereof, it is to be understood that we do not limit ourselves to the specific embodiments thereof except as defined in the following claims.

We claim:
1. In a process of producing chemical compounds having the following formula

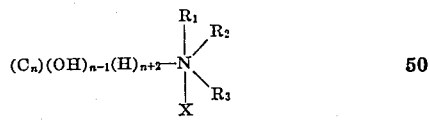

wherein $n$ is 5 or 6, $R_1$ represents an aliphatic radical of at least 8 carbon atoms, $R_2$ and $R_3$ represent the same or different lower aliphatic radicals, and X represents the negative radical of an acid, the step which comprises combining a tertiary amine having the formula

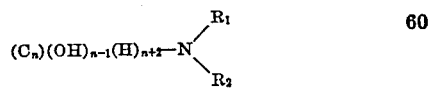

in which $R_1$ and $R_2$ have the foregoing signification, with an aliphatic inorganic ester.

2. In a process of producing chemical compounds having the following formula

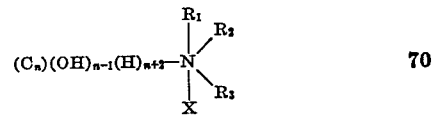

wherein $n$ is 5 or 6, $R_1$ is an alkyl radical having eight or more carbon atoms, $R_2$ and $R_3$ represents the same or different aliphatic radicals having not more than four carbon atoms, and X represents the negative radical of an acid, the step which comprises combining a tertiary amine having the following formula

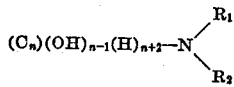

in which $n$, and $R_1$ and $R_2$ have the foregoing signification, with an aliphatic inorganic ester having not more than four carbon atoms.

3. Chemical compounds having the formula

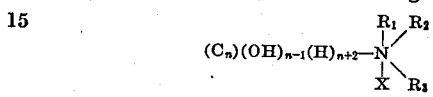

in which $n$ is 5 or 6, $R_1$ is an aliphatic radical having eight or more carbon atoms, $R_2$ and $R_3$ represent the same or different lower aliphatic radicals, and X represents the negative radical of an acid.

4. Chemical compounds having the following formula

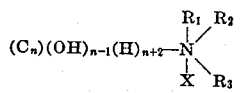

in which $n$ is 5 or 6, $R_1$ is an aliphatic hydrocarbon radical having eight or more carbon atoms, $R_2$ and $R_3$ represent the same or different aliphatic radicals having not more than four carbon atoms, and X represents the negative radical of an inorganic acid.

5. Chemical compounds having the following formula

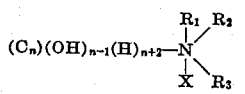

in which $n$ is 5 or 6, $R_1$ is an aliphatic hydrocarbon radical having eight or more carbon atoms, $R_2$ and $R_3$ represent the same or different alkyl radicals having not more than four carbon atoms or hydroxy-alkyl radicals having not more than four carbon atoms, and X represents the negative radical of an inorganic acid.

6. A chemical compound of claim 4, in which $R_1$ is a straight chain aliphatic hydrocarbon radical having at least eight carbon atoms, $R_2$ is an aliphatic hydrocarbon radical having not more than four carbon atoms, $R_3$ is an aliphatic hydrocarbon radical having not more than four carbon atoms, X is a halogen selected from the group consisting of iodine, chlorine and bromine, and the poly-hydroxy aliphatic radical is a normal radical containing six carbon atoms.

7. N-methyl-N-ethyl-N-glucyl cetyl ammonium iodide.

8. Chemical compounds having the following formula:

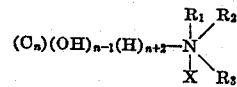

in which $n$ is 5 or 6, $R_1$ is an aliphatic hydrocarbon radical having at least eight carbon atoms, $R_2$ and $R_3$ represent the same or different lower saturated aliphatic radicals, and X represents the negative radical of an acid.

9. Chemical compounds having the following formula:

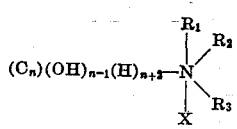

in which $R_1$ is a straight chain aliphatic hydrocarbon radical having twelve to eighteen carbon atoms, $R_2$ is an aliphatic hydrocarbon radical having not more than four carbon atoms, $R_3$ is an aliphatic hydrocarbon radical having not more than four carbon atoms, X is a halogen atom selected from the group consisting of iodine, chlorine and bromine, and the poly-hydroxy aliphatic radical is a normal radical containing six carbon atoms.

10. Chemical compounds having the following formula:

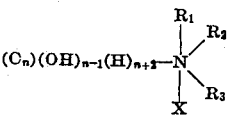

in which $R_1$ is a straight chain aliphatic hydrocarbon radical having sixteen to eighteen carbon atoms, $R_2$ is an aliphatic hydrocarbon radical having not more than four carbon atoms, $R_3$ is an aliphatic hydrocarbon radical having not more than four carbon atoms, X is a halogen atom selected from the group consisting of iodine, chlorine and bromine, and the poly-hydroxy aliphatic radical is a normal radical containing six carbon atoms.

11. An N-methyl-N-ethyl-N-glucyl-cetyl ammonium halide.

12. An N-methyl-N-ethyl-N-glucyl-lauryl ammonium halide.

WILLIAM S. CALCOTT.
RICHARD G. CLARKSON.